United States Patent Office 3,154,598
Patented Oct. 27, 1964

3,154,598
STABILIZED COATING COMPOSITIONS
Joseph Anthony Vasta, Sharon Hill, Pa., assignor to E. I. du Pont de Nemours and Company, Wilmington, Del., a corporation of Delaware
No Drawing. Filed Feb. 3, 1961, Ser. No. 86,852
16 Claims. (Cl. 260—837)

This invention relates to liquid coating compositions containing reactive organic film-forming materials in solution in a solvent therefor and a quaternary ammonium catalyst which accelerates the cure of the reactive film-forming materials and further containing certain tertiary amines as a stabilizer to inhibit a significant increase in viscosity of the fluid composition without inhibiting the cure at ordinary baking temperatures. More particularly the invention relates to catalyzed liquid coating compositions containing as the essential organic film-forming materials a carboxyl-containing interpolymer of a plurality of monoethylenically unsaturated polymerizable monomers including a carboxyl-containing monomer and an epoxy compound having at least one 1,2-oxirane group per molecule in solution in an organic solvent therefor, including in the unit package of catalyzed liquid coating composition a quaternary ammonium salt as a curing catalyst and certain tertiary amines having a plurality of tertiary nitrogen atoms and a plurality of carboxy methyl, i.e., —CH$_2$—COOH, substituents per molecule as a stabilizer to inhibit premature curing and significant viscosity increase in the package.

The use of quaternary ammonium salts to accelerate the cure of mixtures of organic film-forming materials including a carboxyl-containing interpolymer and an epoxy compound is well known in the coating art. Vasta U.S. 2,967,162, Allenby U.S. 2,662,870 and Hicks U.S. 2,934,516 disclose the use of such catalysts. However, in commercial practice, such liquid coating compositions are supplied heretofore as a combination package wherein one unit contains the uncatalyzed liquid coating composition and a second unit contains a solution of the quaternary ammonium salt curing agent, the two units being combined immediately prior to use of the catalyzed composition. Except for special quaternary ammonium salt catalysts which are latent in their curing activity and essentially ineffective at temperatures significantly below ordinary baking temperatures for the curable coating compositions, quaternary ammonium salts are sufficiently active at ordinary room temperature to cause significant change in the viscosity characteristics of the catalyzed composition, i.e., the package stability of the catalyzed composition is so unsatisfactory that it is impractical commercially to package these liquid coating compositions as a ready-to-use catalyzed composition. The short pot life of the catalyzed composition necessitates prompt use of the material and premixing of only that amount of material which can be consumed before significant changes occur in the composition at ordinary temperatures.

The inconveniences of premixing liquid coating compositions and curing catalyst and the necessity of consuming the catalysed composition while it remains in useful condition is well recognized in contrast with the convenience of ready-to-use catalyzed compositions which are characterized by stability in the catalyzed state at ordinary storage and application pot temperatures.

The primary object of this invention is to provide desirable improvements in catalyzed curable coating compositions of the above-identified class which enhance the stability and pot life of the compositions and thereby permits the catalyzed compositions to be packaged as single units of liquid coating compositions including an appropriate proportion of quaternary ammonium catalyst.

This important objective and other objectives hereinafter disclosed are accomplished by (I) combining (a) a carboxyl-containing interpolymer made up of units from a plurality of monoethylenically-unsaturated copolymerizable monomers including a carboxyl-containing monomer and (b) an epoxy compound compatible therewith having at least one 1,2-oxirane group per molecule in the presence of a volatile liquid inert organic solvent for (a) and (b) to form a liquid solution thereof, (II) including in the liquid solution composition a soluble tertiary amine stabilizer having a plurality of tertiary nitrogen atoms and a plurality of carboxymethyl, i.e., —CH$_2$—COOH, substituents per molecule of the amine in an effective stabilizing proportion, preferably up to about 0.1% by weight of the total composition, and (III) adding a quaternary ammonium salt as a catalyst to accelerate the cure of the interpolymer (a) and the epoxy compound (b) at ordinary baking temperatures.

Useful tertiary amine stabilizers are defined more specifically by the general formula

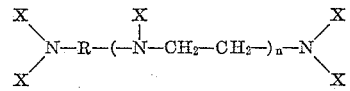

where —R— is a C$_2$ to C$_6$ divalent saturated hydrocarbon radical and $n$ is an integer having a value of 0, 1, 2, 3, etc., the radical —R— being —CH$_2$—CH$_2$— when $n$ is an integer having a value greater than 0. The monovalent substituents —X are preponderantly

—CH$_2$—COOH i.e., each tertiary amine molecule as defined includes at least three —CH$_2$—COOH substituents, any remaining —X substituents up to two per molecule being —CH$_2$—CH$_2$—OH, i.e., hydroxyethyl. Preferred tertiary amine stabilizers include ethylenediamine tetraacetic acid hydroxy-ethylethylenediamine triacetic acid, diethylenetriamine pentaacetic acid, diaminocyclohexane tetraacetic acid, or mixtures thereof, the ethylenediamine tetraacetic acid being especially preferred. Other useful tertiary amine stabilizers include alkylenediamine tetraacetic acids and hydroxyethylalkylenediamine triacetic acids in which the alkylene radical contains 3 to 6 carbon atoms, polyethylenepolyamines where $n$ is 1, 2, or 3 and up to two of the X— substituents are

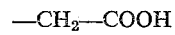

and at least 2 plus $n$ of the X— substitutions are —CH$_2$—COOH. While tertiary amines of the defined type having a value of $n$ greater than 3 are useful, there are no advantages to be gained from using the higher molecular weight species. The species which provide the maximum of four equivalents of —CH$_2$—COOH substituents per two amino nitrogen atoms are preferred, e.g., ethylenediamine tetraacetic acid. When one of the —CH$_2$—COOH substituents of this tetraacetic acid molecule is replaced with 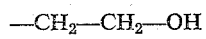, the remaining preponderant proportion of carboxymethyl substituents is sufficient to provide adequate stabilization. When two of the X— substituents in this tertiary diamine molecule are —CH$_2$—CH$_2$—OH, the molar proportion of —CH$_2$—COOH substituent no longer is preponderant and performance of such a stabilizer is inadequate when the molecule contains only two —$CH_2$—COOH substituents. In the tertiary amines where $n$ is 1, 2, 3 or higher, the presence of one or two —$CH_2$—$CH_2$—OH substituents in the molecules provides for a preponderance of —X substituents as —$CH_2$—COOH and such tertiary polyamines function satisfactorily as stabilizers.

Useful proportions of the tertiary amine stabilizers range ordinarily from about 0.0025% to 0.1% by weight based on the total weight of the liquid coating composition, i.e., of the order of magnitude of .025 to 1 pound of the stabilizer per 100 gallons of coating composition. Preferred proportions of ethylenediamine tetraacetic acid are in the range of about 0.04 to 0.1 pound per 100 gallons of liquid coating composition.

Numerous quaternary ammonium catalysts can be used to effect the cure of the reactive organic film-forming materials. Useful catalysts include for example, benzyltrimethyl ammonium hydroxide, benzyltrimethyl ammonium acetate, benzyltriethyl ammonium formate, benzyldimethyl ammonium hexoate, benzyldimethyl ammonium octoate, octadecyltrimethyl ammonium acetate, octadecyl trimethyl ammonium acid phthalate, alkyltrimethyl ammonium chlorides and dialkyldimethyl ammonium chloride wherein the alkyl substituents are composed of aliphatic hydrocarbon chains containing 8 to 20 carbon atoms, and other quaternary ammonium salts of this class having the chloride anion replaced wholly or in part with other anions which may be organic or inorganic and monovalent or polyvalent. The commercially available "Arquad" quaternary ammonium salts of the alkyltrimethyl ammonium chloride and dialkyldimethyl ammonium chloride types can be used as is or as starting materials for the preparation of additional quaternary ammonium salts having other anions. Copending application Fang U.S. Serial No. 856,939, filed December 3, 1959, describes novel quaternary ammonium catalysts which function as latent catalysts. Although use of latent catalysts indicates a lesser need for stabilization with the polyamine polyacetic acid stabilizers of the present invention, the presence of these useful stabilizers as herein defined in the liquid compositions containing latent quaternary ammonium catalysts enhances the package stability and pot life.

Effective proportions of the quaternary ammonium catalyst range ordinarily from about 0.05% with the low molecular weight species having a tetra $C_1$ to $C_4$ alkyl ammonium cation to about 5% with high molecular weight species, based on the weight of the organic film-forming components. Preferred proportions ordinarily fall in the range of 0.1% to 2% on the indicated basis. Inasmuch as the organic film-forming materials constitute generally a minor proportion of the total weight of the liquid coating composition, the relative proportions of the quaternary ammonium catalyst and the tertiary amine stabilizer usually are substantially of the same order of magnitude.

The carboxyl-containing interpolymers which constitute one of the essential organic film-forming materials of the coating composition are made up of units from a plurality of copolymerizable monoethylenically unsaturated, preferably alpha, beta unsaturated, monomers including a carboxyl-containing monomer in such proportions that conent of carboxyl substituent in the interpolymer molecule is preferably no greater than 25 mol percent and ordinarily at least 1 mol percent. Especially preferred monomers have the ethylenic-unsaturation as alpha-beta ethylenic unsaturation, a major proportion of which is represented by an alpha methylene group.

Useful carboxylic monomers include acrylic acid, methacrylic acid, ethacrylic acid, phenyl acrylic acid, itaconic acid, maleic acid, fumaric acid and half esters of maleic, fumaric or itaconic acid and a monohydric alcohol free of non-benzenoid carbon-to-carbon unsaturation.

Useful monomers making up the balance of the units of the carboxyl-containing interpolymer can be selected widely to provide the interpolymer with desired characteristics in reference to the end use of the coating composition formulated therewith. A mixture of two or more of the non-carboxylic monomers is used ordinarily in combination with the carboxylic monomer to provide the interpolymer with a desired balance of properties. Esters of acrylic acid and alkanols having up to 20 carbon atoms per molecule are particularly useful and inasmuch as these monomers yield soft homopolymers, they are used in combination with monomers which yield harder homopolymers. Esters of methacrylic acid and alkanols, particularly the lower $C_1$ to $C_4$ alkanols, are ester monomers useful in combination with the plasticizing acrylates. Vinyl aromatic hydrocarbon monomers are used advantageously in combination with the acrylate monomers. Vinyl benzene, i.e., styrene, and lower alkyl-substituted vinyl benzenes are preferred hydrocarbon monomers.

While useful monomers may contain reactive functional groups in addition to the polymerizable unsaturation, it will be recognized that the monomers should be so selected that are are substantially non-reactive with the carboxyl-containing monomer under the conditions of copolymerization.

Curable coating compositions formulated with carboxylic-containing interpolymers in combination with an epoxy compound having 1,2-oxirane functionality are found to be particularly useful as appliance finishes in consideration of the balance of properties which can be achieved.

In the more specific aspects, this invention is concerned with stabilization of liquid coating compositions of which the coatings deposited therefrom and cured by appropriate heating are designed as finishes for electrical appliances such as refrigerators, freezers, washing machines and clothes driers, and for related articles such as kitchen cabinets. In this field there is a continuing search for coatings having improved properties, particularly an improved balance of properties which make the coatings unusually serviceable on such articles in the absence of underlying metal-protective prime coats. These properties include hardness, flexibility, adhesion, gloss, durability, and resistance to adverse effects from abrasion (wear), grease, fumes, foods, soaps, detergents, and other chemicals, and in the case of clothes driers, exposure to high temperatures. Simultaneously, useful products of this type, in order to be acceptable to the manufacturer of the finished article, must be capable of being applied by conventional methods and of being baked under industrial conditions to yield unblemished coatings; and they must be economical to use in relation to previously adopted coating compositions.

For this purpose, the carboxyl-containing interpolymers are made up preferably of 30 to 80 mol percent of (A) units from styrene, 15 to 65 mol percent of (B) units from at least one alpha, beta-unsaturated monovinylidene ester of the general formula

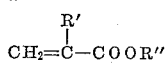

where R′ is preferably H— or $CH_3$—, but may be another lower alkyl or phenyl, and R″— is a $C_1$ to $C_{20}$, preferably $C_1$ to $C_8$, saturated aliphatic monovalent hydrocarbon radical, and 5 to 25 mol percent (C) units from the carboxyl-containing monomers as defined above.

The preferred interpolymers usually have relative viscosities in the range of 1.07–1.17, as determined by a procedure fully described hereinafter. Such interpolymers are particularly adaptable to liquid coating compositions of the type designed for the indicated end use because (1) their degree of polymerization is sufficient to provide a desirable solids content and viscosity in the liquid coating compositions, a desirable thickness of smooth coating by conventional methods of application, and desirable toughness, durability, film integrity and other physical and chemical properties in the dried coatings, and (2) their degree of polymerization is not sufficient to yield the undesirable or impractical results of gelation, insolubility in common solvents, incompatibility with the other film-forming components of the liquid coating compositions, and uneconomical thin coatings resulting from low solids content at practical application viscosities for the liquid coating compositions.

The epoxy compound constituting the second essential organic film-forming material can be selected widely in providing a desired balance of properties. It is the 1,2-oxirane functionality of these compounds which in combination with the carboxyl functionality in the presence of the curing catalyst that causes the instability of the liquid coating composition. Useful epoxy compounds having the essential 1,2-oxirane functionality include diphenylol propane diglycidyl ether, polymeric epoxyhydroxy polyethers resulting from condensation of diphenylolpropane or other polyhydric phenols with epichlorohydrin such as prepared in accordance with well known methods, such as those disclosed in U.S. 2,503,726, 2,528,985, 2,592,560 and 2,694,694. These epoxyhydroxy polyether resins contain one or more 1,2-oxirane groups per molecule. Those having an average of more than one such epoxy group per molecule are preferred; fatty acid esters of such epoxyhydroxy polyether condensates prepared as described in U.S. 2,456,408; and epoxidized oils prepared, following known processes such as are disclosed in U.S. 2,569,502, by epoxidizing the naturally-occurring or equivalent oil esters synthesized from glycerol or other polyhydric alcohols, e.g., sorbitol and the $C_8$–$C_{22}$ vegetable oil acids, of which at least one is ethylenically unsaturated. Examples of such unsaturated oils include soya oil, linseed oil, dehydrated castor oil, perilla oil, cottonseed oil, etc. Epoxy-hydroxy polyether resins useful in practicing this invention are also available on the open market. Useful epoxidized vegetable oils can be purchased also on the open market.

Another source of epoxy compounds having 1,2-oxirane functionality are polymers of esters of glycidyl, i.e. 2,3-epoxypropanol-1, and an alpha, monoethylenically unsaturated monocarboxylic acid, e.g., glycidyl methacrylate or acrylate, allyl glycidyl ether, and interpolymers of these glycidyl monomers with another monoethylenically-unsaturated monomer copolymerizable therewith.

Useful proportions of the essential carboxyl-containing interpolymer ordinarily range from 30% to 95%, preferably 60% to 90%, by weight of the organic film-forming material of the coating composition and complementally 5% to 70%, preferably 10% to 40% of the essential epoxy compound. Some of the preferred formulations are at least ternary in composition, including at least one heat-reactive aminoplast condensate of the group of melamine-formaldehyde-alcohol, urea-formaldehyde-alcohol and benzoquanamine-formaldehyde-alcohol condensates. These aminoplast condensates useful in the coating compositions of this invention are the types commonly used in organic baking enamels. They are prepared by well known methods involving, fundamentally, reacting melamine and formaldehyde or a reaction product thereof, e.g., tetra-, penta- or hexamethylol melamine, with a $C_1$ to $C_4$ saturated aliphatic monohydric alcohol, i.e., methanol, ethanol, propanol, or butanol, usually in excess of the amount required to etherify all of the methylol groups; reacting urea and formaldehyde or a reaction product thereof, e.g., dimethylol urea, with one of the indicated $C_1$–$C_4$ alcohols; or reacting benzo-quanamine and formaldehyde or a reaction product thereof with the $C_1$–$C_4$ alcohol. Suitable methods are disclosed in U.S. 2,191,956 and 2,197,357. A wide variety of suitable condensates of these types are readily available in the resin market usually in the form of solutions containing 50%–60% of the non-volatile condensate in a convenient volatile solvent. Coating resins of these classes are commercially available by several suppliers. Ordinarily, useful proportions of the aminoplast condensates range up to 65% by weight of the entire organic film-forming material. As indicated from the proportions recited for the essential film-forming materials, the aminoplast condensate can be entirely absent from the composition, i.e., the proportion of aminoplast condensate ranges from 0 to 65%.

The organic film-forming materials are in solution in a volatile liquid organic solvent therefor. Suitable solvents, and diluents which can be used in admixture with solvents, include aromatic and aliphatic hydrocarbons, alcohols, ketones, and esters. Mixtures of aromatic hydrocarbons, such as xylene, and aliphatic monohydric alcohols, such as butanol, are preferred. The solvent or solvent mixture, and any diluent which may be used, preferably characterized by a boiling end point no greater than 200° C., must be volatile to the extent that it evaporates readily from a wet coating during the subsequent baking step, i.e., drying or curing, and leaves a dry coating. The amount of solvent, plus diluent if used, is not critical. It usually is within the range of 10%–85% of the total coating composition, i.e., the non-volatile content may be from 15% to 90% for pigmented compositions. The content of organic film-forming material may be as low as 5% in practical clear compositions.

Examples of suitable pigments which may be used include metal oxides, hydrous metal oxides, chromates, silicates, sulfides, sulfates and carbonates, carbon blacks, organic dyestuffs and lakes thereof and metal flake pigments like aluminum. Since the interpolymers contain free carboxyl groups, acid-sensitive and strongly basic reacting pigments are preferably avoided. The amount of pigment is not critical. It usually is within the range of 1%–200% by weight of the total organic film-forming material present.

Still other suitable liquid coating compositions, including the essential organic film-forming materials of the classes heretofor defined and which in the presence of the quaternary ammonium curing catalyst can be improved in stability in accordance with this invention, are described in U.S. Patents 2,604,464; 2,662,870; 2,934,516 and 2,967,162, and in copending U.S. patent applications LaBarre, Serial No. 840,026, filed September 15, 1959, now U.S. Patent 3,014,881, and Pascale Serial No. 79,109, filed December 29, 1960.

The coating compositions of this invention can be applied by any conventional method such as spraying, brushing, dipping, flowing or roller coating. Spraying is preferred. The coatings are baked by conventional methods to harden and insolubilize them and to develop the improved properties to an optimum degree. Baking times and temperatures are not critical but, in order to obtain the best results, the widely used commercial baking schedules are preferred. These range from 45–60 minutes at about 250° F. to 10–20 minutes at about 400° F. The optimum range is usually from 25–30 minutes at about 280° F. to 15–20 minutes at 350° F.

The peculiar advantage of the liquid coating compositions of this invention is that quaternary ammonium compounds, which are known activators or catalysts for organic film-forming compositions containing a combination of carboxyl and 1,2-oxirane (epoxy) functionalities, can be included at effective curing proportions with these reactive organic film-forming components in a single package of the liquid coating composition when the compositions include additionally effective proportions of the tertiary amine stabilizers defined herein. The effective stabilizing proportions of these tertiary amines provides advantageous improvement in package-stability and increased pot life without having an adverse effect on the properties and performance of the finishes deposited therefrom and cured.

The following examples are provided to illustrate the principles and practice of this invention, but its scope is not limited to the exact details of these illustrative examples. Unless otherwise indicated, the parts and percentages are given by weight.

EXAMPLE 1

Coating Composition

|  | Parts by weight |
|---|---|
| First portion: | |
| Terpolymer A solution, 55% | 95 |
| Butanol | 100 |
| Titanium dioxide pigment | 274 |
| Aromatic hydrocarbon ("Solvesso" 100) | 11 |
| Second portion: | |
| Terpolymer A solution, 55% | 342 |
| Epoxy resin solution, 50% | 90 |
| Epoxidized soya oil ("Paraplex" G-62) | 16 |
| Isopropanol, anhydrous | 54 |
| Third portion: | |
| Wax dispersion including EDTA [1] | 18 |
|  | 1000 |
| Fourth portion: | |
| Quaternary ammonium catalyst solution I, 20% in xylol | 2.5 |
|  | 1002.5 |

[1] Ethylenediamine tetraacetic acid.

The terpolymer A solution is prepared according to the following recipe:

|  | Parts by weight |
|---|---|
| First portion: | |
| Aromatic hydrocarbon, B.R. 150°–190° C., aniline point –28° C. ("Solvesso" 100) | 1221 |
| Xylol, 10° industrial | 407 |
| Second portion: | |
| Styrene | 1993 |
| Ethyl acrylate | 1328 |
| Maleic anhydride | 475 |
| Di-tertiary butyl peroxide | 45 |
| Third portion: | |
| 2-ethylhexanol | 1263 |
| Fourth portion: | |
| Butanol | 1328 |
|  | 8060 |

The first portion is charged into a polymerization reaction vessel equipped with stirring means, reflux means and temperature control means and heated to reflux temperature, i.e., about 154° C. Then the premixed second portion is added with moderate stirring to the refluxing first portion at a uniform rate during a two-hour period, the rate being such that the temperature is maintained in the range of 140° to 154° C. Refluxing of the charge is continued for two additional hours. The third portion is added to the resulting polymer solution and refluxing is continued for two hours under which conditions one of the two carboxyl substituents of the maleic acid units of the terpolymer are esterified with 2-ethylhexanol. Thereafter, the fourth portion, i.e., the butanol as a solvent, is added slowly with mixing over a 30-minute period as the solution is allowed to cool. The resulting interpolymer is made up essentially of units in the following approximate proportions: 51.4 mol percent styrene, 35.6 mol percent ethyl acrylate and 13 mol percent butoxyethyl acid maleate which correspondingly on a weight basis is about 45% styrene, 30% ethyl acrylate and 25% butoxyethyl acid maleate. The resulting solution of the interpolymer in the mixture of hydrocarbon solvents, butanol, and unreacted monobutyl ether of ethylene glycol is characterized as follows:

| | |
|---|---|
| Interpolymer content | 55%. |
| Acid number | 62. |
| Gardner-Holdt viscosity | $Z_1$ at 25° C. |
| Relative viscosity | 1.135. |

Relative viscosity is determined by first spreading about 2–3 cc. of interpolymer solution over an area of about 3 square inches in an aluminum foil dish and heating the thus-prepared sample dish in an oven at about 120° C. for 3 hours to obtain interpolymer substantially free from solvent. From the resulting dry interpolymer, a solution is made containing 0.50 gram of interpolymer in 50 ml. of ethylene dichloride. The efflux time of this solution is measured at 25° C. in accordance with ASTM-D-445–53T using the solution as the "oil" in said ASTM method. A Cannon-Fenske (modified Ostwald) viscosimeter for transparent liquids, series or size number 100, is used in accordance with Appendix A of the designated method. The efflux time of a sample of the ethylene dichloride used in making said solution is likewise determined. Relative viscosity, $N_r$, of the interpolymer is calculated from the equation:

$$N_r = \frac{\text{efflux time of polymer solution}}{\text{efflux time of ethylene dichloride}}$$

The epoxy resin solution consists of "Epon" 1001 at 50% concentration in a mixed solvent made up of equal parts by weight of 10° xylol and anhydrous isopropanol. "Epon" 1001 is a resinous epoxyhydroxy polyether condensate having 1,2-oxirane groups and hydroxyl groups resulting from condensation of diphenylol propane and epichlorohydrin in proportions of these reactants and under conditions which yield a resin characterized by an epoxide equivalent weight in the range of 450 to 525, an esterification equivalent weight of about 145 and a melting point in the range of 64° to 76° C. by the Durran mercury method.

The wax dispersion is prepared by pebble grinding the following composition for 72 hours.

| | Parts |
|---|---|
| Interpolymer A solution, 55% | 30.3 |
| Polymerized microcrystalline wax, 200/220° F. | 14.8 |
| Butyl alcohol | 53.4 |
| Ethylenediamine tetraacetic acid | 1.5 |
| Total weight | 100.0 |

"Polymekon" wax is a representative useful polymerized microcrystalline wax having a melting point in the range of 200° to 220° F. Cardis Polymer #10 wax, a polymerized-oxidized wax of petroleum origin characterized by the ASTM-D-87-57 melting point of 210° to 220° F., saponification number of 25 to 30 and an acid number of 8 to 10, and other waxes of equivalent characteristics can be used in place of the specified microcrystalline wax.

The ethylenediamine tetraacetic acid, designated for convenience as EDTA, is commercially available under the designations "Versene" Acid and "Sequestrene" AA.

The quaternary ammonium catalyst solution I consists of octadecyl trimethylammonium acid phthalate at 20% concentration in xylol.

The coating composition is prepared by dispersing the pigment in a portion of the terpolymer solution as described in the first portion, using ordinary dispersion techniques. The components of the second portion are mixed with the completed first portion and then the third portion is mixed uniformly with the combined preceding portions to complete the uncatalyzed coating composition. Then the catalyst solution is added and distributed uniformly throughout the composition.

The resulting coating composition contains about 58.1% of non-volatile coating materials including about 27.4% of pigment, 30.5% of resinous organic film-forming materials and the wax in the proportion of about 1 part per 100 parts of the organic film-forming materials. The content of EDTA is about 0.09 part per 100 parts of the organic film-forming material. The catalyst concentration is about 0.16 part per 100 parts of the organic film-forming material.

Comparative composition A is prepared using a recipe identical with that of Example 1 except that the specified wax dispersion is replaced with another wax dispersion of the same composition except for omission of the EDTA.

Portions of the respective coating compositions are stored in sealed containers at room temperature and in an oven at 120° F. and thereafter examined for viscosity change during the hermetic storage. The respective initial viscosities measured with a #3 Zahn cup at 25° C. are 28 seconds for the Example 1 composition and 27 seconds for the comparative composition. During a period of two weeks of accelerated aging in the 120° F. oven, the Example 1 composition exhibits about 100% increase over the initial viscosity. In the same period of time the comparative composition registers an increase of about 440% and gels completely in three weeks. The Example 1 composition registers an increase of about 280% in three weeks and remains in useful liquid condition for at least four weeks. During three months of shelf storage at room temperature of about 77° F., the comparative composition A registers about 100% increase in viscosity while the Example 1 composition registers about 40% increase in that period. The small proportion of EDTA significantly enhances the pot life and package stability of the catalyzed composition to a level at which it is practical to supply a one-package catalyzed composition. Ordinarily these compositions in the absence of the EDTA are supplied as a two-package combination of uncatalyzed coating composition and separately packaged catalyst solution to be combined by the customer immediately prior to use because of the low level stability of the catalyzed composition.

EXAMPLE 2

This coating composition is prepared identical with that of Example 1 except that lauryl trimethyl ammonium perchlorate is used in the following proportion in place of the quaternary ammonium acid phthalate specified.

| | Parts by weight |
|---|---|
| Uncatalyzed Example 1 composition (combined first, second and third portions) | 1000 |
| Quaternary ammonium perchlorate catalyst solution II, 10% | 10 |
| | 1010 |

A comparative composition B is prepared having the identical composition with the exception that the EDTA is omitted.

Catalyst solution II consists of a 10% solution of lauryl trimethyl ammonium perchlorate in diacetone alcohol. Alternatively monomethyl ether of ethyleneglycol, i.e., methyl "Cellosolve," is a particularly useful solvent which may be specified in place of the diacetone alcohol. The quaternary ammonium perchlorate salt is prepared by reacting a dilute aqueous solution of ammonium perchlorate with a dilute aqueous solution of lauryl trimethyl ammonium chloride, recovering the precipitated perchlorate salt, drying the salt and dissolving it in the organic solvent.

Aliquot portions of the Example 2 composition and comparative composition B, each having a viscosity of 25 seconds, are stored hermetically in containers in an aging oven at 120° F. During two weeks of accelerated aging, the Example 2 composition exhibits a 48% increase in viscosity as measured at 25° C. using a Zahn #3 cup. In contrast, the comparative composition B registers an increase of 80%. During a three-week period, the Example 2 composition increases about 75% and comparative composition B increases 200%. During a four-week period, the viscosity increase for the Example 2 composition is slightly less than 150% and the comparative composition B registers an increase of slightly more than 500%. The Example 2 composition stored at room temperature of about 77° F. registers a viscosity increase of about 30% during the three-month storage period.

Master Batch for Examples 3, 4 and 5

| | Parts by weight |
|---|---|
| First portion: | |
| Terpolymer A solution, 55% resin content | 448 |
| Butanol | 483 |
| Titanium dioxide pigment | 1306 |
| Aromatic hydrocarbon ("Solvesso" 100) | 54 |
| Second portion: | |
| Terpolymer A solution, 55% | 1421 |
| Epoxy resin solution, 50% | 522 |
| Butanol | 45 |
| Third portion: | |
| Quaternary ammonium catalyst solution I | 11 |
| Isopropanol | 148 |
| | 4438 |

The terpolymer and the epoxy resin are the same as specified in Example 1. These essential organic film-forming materials are in the relative proportions of 20 parts of epoxy resin per 80 parts of the terpolymer. The pigment is dispersed in the solution of the terpolymer as defined by the first portion, then the components of the second portion are combined with the completed first portion, and then the third portion is added with the combined preceding portions and the composition is mixed until uniform.

EXAMPLE 3

| | Parts by weight |
|---|---|
| Master batch | 550 |
| Wax dispersion 2 containing stabilizer | 11 |
| | 561 |

Wax dispersion 2 has the following composition:

| | Parts by weight |
|---|---|
| Terpolymer A solution, 55% | 30.4 |
| Microcyrstalline wax ("Polymekon") | 14.8 |
| Diethylenetriamine pentaacetic acid ("Chel" 330 Acid) | 1.5 |
| Butanol | 53.3 |
| | 100.0 |

The components for the dispersion are charged into a porcelain lined ball mill and pebble ground for 72 hours. Presence of the wax is not essential to the functioning of the polyamine polyacetic acid stabilizer and may be omitted from the wax dispersion and from the final composition. The wax may also be separately dispersed and added independently of the stabilizer.

The master batch and wax dispersion containing the stabilizer are mixed by ordinary paint mixing technique until uniform.

EXAMPLE 4

| | Parts by weight |
|---|---|
| Master batch | 550 |
| Wax dispersion 3 containing stabilizer | 11 |
| | 561 |

Wax dispersion 3 has a composition identical with that of wax dispersion 2 with the exception that hydroxyethyl-ethylenediamine triacetic acid, i.e., "Chel" DM Acid, is substituted directly for the same weight of diethylenetriamine pentaacetic acid.

EXAMPLE 5

| | Parts by weight |
|---|---|
| Master batch | 550 |
| Wax dispersion 4 containing stabilizer | 11 |
| | 561 |

Wax dispersion 4 has a composition identical with that of wax dispersion 2 with the exception that 1,2-diaminocyclohexane tetraacetic acid, i.e., "Chel" 600, is substituted directly for the same weight of diethylenetriamine pentaacetic acid.

EXAMPLE 6

| | Parts by weight |
|---|---|
| Master batch | 550 |
| Wax dispersion 5 containing EDTA stabilizer | 11 |
| | 561 |

Wax dispersion 5 has a composition identical with that of wax dispersion 2 with the exception that EDTA, i.e., ethylenediamine tetraacetic acid, is specified as the polyamine polyacetic acid stabilizer in place of the indicated amount of diethylenetriamine pentaacetic acid.

*Comparative Compositions*

| | Parts by weight | | |
|---|---|---|---|
| | C | D | E |
| Master Batch | 550 | 550 | 550 |
| Wax Dispersion 6 | 11 | | |
| Wax Dispersion 7 | | 11 | |
| Wax Dispersion 8 | | | 11 |
| | 561 | 561 | 561 |

Wax dispersions 6 and 7 each has a composition identical with that of wax dispersion 2 with the exception that the disodium salt of ethylenediamine tetraacetic acid, i.e., "Sequestrene" $Na_2$, and the tetrasodium salt of ethylenediamine tetraacetic acid, i.e., "Sequestrene" $Na_4$ are specified respectively in place of the indicated amount of polyamine polyacetic acid stabilizer. Wax dispersion 8 has a composition identical with that of wax dispersion 2 with the exception that the polyamine polyacetic acid stabilizer is omitted and the content of the butanol is increased correspondingly by 1.5 parts.

The respective compositions represented by Examples 3, 4, 5 and 6 and comparative compositions C, D, and E, all having an initial viscosity in the range of 30 to 34 seconds, Zahn #3 cup, are subjected to accelerated stability tests by hermetic storage in a 120° F. oven and to shelf stability tests at room temperature of about 77° F. The compositions of Examples 3, 4, 5 and 6 exhibit a significantly lower rate of viscosity increase in comparison with comparative composition E which does not include a polyamine polyacetic acid stabilizer. Composition E registers about 140% increase in visocsity over a two-week period and is gelled to a non-useful condition during four weeks of oven storage. These stabilized compositions of the invention exhibit a viscosity increase ranging up to about 30% during one week and ranging up to about 100% during two weeks' oven storage; and these compositions remain useful during the full storage period of four weeks. The compositions of Example 6 containing EDTA and Example 5 containing 1,2-diaminocyclohexane tetraacetic acid, each of these stabilizers containing maximum proportion of four acetic acid groups per two amino nitrogen atoms, exhibit slight advantage over the compositions of Examples 3 and 4 having a relatively lower proportion of the acetic acid substituents.

Surprisingly, when the acetic acid substituents of the polyamine polyacetic acid are neutralized wholly or in part by formation of an alkali metal salt thereof, e.g., the disodium salt of EDTA and tetrasodium salt of EDTA as represented by comparative compositions C and D, the resulting salts not only fail to register an improvement in stability of the compositions, but rather accelerate viscosity increase. Comparative composition C containing the disodium salt registers about 50% increase in viscosity during one week, about 300% increase during two weeks and is fully gelled during four weeks of oven storage. Comparative composition D containing the tetrasodium salt of ethylene diamine tetraacetic acid registers about 100% increase in viscosity during one week and nearly 500% during two weeks' storage in the oven. The rate of viscosity increase for these comparative compositions C and D is significantly greater than that of comparative composition E which does not include a polyamine polyacetic acid stabilizer.

In the shelf stability tests, the compositions of Examples 3, 4, 5 and 6 exhibit improved viscosity stability over a test period of three months in comparison with the unstabilized comparative composition E. Comparative compositions C and D containing the alkaline salts of the effective polyamine polyacetic acid EDTA exhibit accelerated viscosity increase in reference to the unstabilized comparative composition E.

These several example compositions and several comparative compositions are respectively applied to Bonderite 1000 steel panels at a dry coating thickness in the range of 1.5 to 1.8 mils with one series of coated panels being baked for 30 minutes at 320° F. and a second series being baked for 30 minutes at 350° F. The resulting cured coatings are subjected to a series of film property tests used ordinarily for characterizing appliance enamels, e.g., flexibility, impact resistance, gloss, hardness, soap and detergent resistance, humidity resistance, hot water soak resistance, salt spray resistance, grease resistance, and resistance to ultra-violet exposure. Test results show that presence of the indicated polyamine polyacetic acid stabilizers at effective stabilizing proportions is not detrimental to the properties of the cured coatings, the film property ratings for the cured enamels of the described invention compositions being at least equal to the ratings for the comparative compositions which do not contain the stabilizer. In reference to several film properties, e.g., gloss, flexibility and impact resistance, the ratings for the cured enamels of the stabilized invention compositions are slightly but consistently higher than those of the comparative unstabilized compositions. Thus, the polyamine polyacetic acid stabilizers provide advantages in the cured enamels in addition to providing improved stability to the coating compositions in the wet state.

EXAMPLE 7

A master batch is prepared similar to that described above with the exception that terpolymer A solution is replaced partially with a 50% solution of melamine-formaldehyde butanol condensate in butanol and with castor oil in sufficient proportions to provide the organic film-forming material with the following composition per 100 parts by weight: terpolymer A—60 parts, epoxy condensate—20 parts, aminoplast condensate—10 parts and castor oil—10 parts. The composition is completed by formulating as shown in Example 6. The stability of the resulting Example 7 composition is comparable with that of Example 6 and represents a significant improvement over that of comparative composition E.

The terms "tertiary amine stabilizer" and "polyamine polyacetic acid stabilizer" are used interchangeably throughout the specification to designate the useful stabilizers identified by the indicated general formula.

I claim:

1. A liquid coating composition, characterized by improved package stability and pot life, comprising an organic film-forming material consisting essentially of (a) a carboxylic interpolymer made up of units from a plurality of copolymerizable alpha monoethylenically-unsaturated monomers including carboxylic units from an alpha, beta monoethylenically-unsaturated carboxylic monomer having from one to two carboxyl moieties per molecule in a proportion sufficient to provide the resulting carboxylic interpolymer with from 1 to 25 mol percent of the carboxyl moiety, and (b) a film-forming epoxy compound compatible therewith having at least one oxirane moiety per molecule, characterized by an oxirane oxygen atom linked to two adjacent carbon atoms, any functional moieties in addition to said 1,2-oxirane moiety in said epoxy compound reactive with carboxyl moieties of said carboxylic interpolymer being limited to hydroxyl moieties, a quaternary ammonium catalyst, and an aliphatic polyamine polyacetic acid stabilizer characterized as having a plurality of tertiary amine nitrogen atoms including two terminal tertiary amine nitrogen atoms, each tertiary nitrogen atom being linked to an adjacent nitrogen atom through a linking divalent saturated hydrocarbon radical of two to six carbon atoms, said linking hydrocarbon radical having no more than two carbon atoms when said plurality of tertiary nitrogen atoms exceeds two, the valences of said tertiary amine nitrogen atoms in excess of those satisfied by said linking divalent hydrocarbon radical being satisfied with at least three —$CH_2$—COOH moieties and no more than two —$CH_2$—$CH_2$—OH moieties, said film-forming material being in solution in a volatile liquid inert organic solvent therefor.

2. A liquid coating composition of claim 1 wherein said polyamine polyacetic acid is a diamine polyacetic acid characterized as having only said two terminal tertiary amine nitrogen atoms, said terminal nitrogen atoms being linked by a $C_2$ to $C_6$ divalent saturated hydrocarbon radical, the four valences of said tertiary nitrogen atoms in excess of those satisfied with said linking radical being satisfied with 3 to 4 of said —$CH_2$—COOH moieties per molecule.

3. A liquid coating composition of claim 1 wherein said polyamine polyacetic acid is a polyethylene polyamine polyacetic acid characterized by a plurality of said 3 to 5 tertiary amine nitrogen atoms each linked to an adjacent tertiary nitrogen atom by a divalent —$CH_2$—$CH_2$— radical, the valences of said tertiary nitrogen atoms in excess of those satisfied by said —$CH_2$—$CH_2$— linking radicals being satisfied with from 3 to 7 of said —$CH_2$—COOH moieties per molecule.

4. A liquid coating composition, characterized by improved package stability and pot life, consisting essentially of paint pigment, an organic film-forming material, which in 100 parts by weight thereof, consists essentially of 30 to 95 parts of (a) a carboxylic interpolymer made up of units from a plurality of copolymerizable alpha monoethylenically-unsaturated monomers, alpha, beta monoethylenically-unsaturated carboxylic monomer having from one to two carboxyl moieties per molecule and 5 to 70 parts of (b) a film-forming epoxy compound compatible therewith having per molecule at least one oxirane moiety, characterized by an oxirane oxygen atom linked to two adjacent carbon atoms, comprising an epoxyhydroxy polyether condensate of diphenylolpropane and eipchlorohydrin, any functional moieties in addition to said 1,2-oxirane moieties in said epoxy compound reactive with carboxyl moieties in said carboxylic interpolymer being limited to hydroxyl moieties, solvent for said film-forming materials, a quaternary ammonium catalyst, and, as a stabilizer, an aliphatic polyamine polyacetic acid characterized as having a plurality of tertiary amine nitrogen atoms including two terminal tertiary amine nitrogen atoms, each tertiary nitrogen atom being linked to an adjacent nitrogen atom through a linking divalent saturated hydrocarbon radical of two to six carbon atoms, said linking hydrocarbon radical having no more than two carbon atoms when said plurality of tertiary nitrogen atoms exceeds two, the valences of said tertiary amine nitrogen atoms in excess of those satisfied by said linking divalent hydrocarbon radical being satisfied with at least three —$CH_2$—COOH moieties and no more than two —$CH_2$—$CH_2$—OH moieties, said carboxylic interpolymer being made up essentially of 30 to 80 mol percent of (A) units from a monocyclic vinyl aromatic hydrocarbon, 15 to 65 mol percent of (B) units from at least one alpha monoethylenically-unsaturated ester monomer having the general formula $$CH_2=\overset{R'}{\underset{}{C}}-COOR''$$

where R'— is a monovalent radical selected from the class consisting of H—, and $CH_3$, and R"— is a $C_1$ to $C_{20}$ alkyl radical, and a proportion of (C) carboxylic units from at least one of said alpha, beta monoethylenically-unsaturated carboxylic acid monomer having said 1 to 2 carboxyl moieties per molecule sufficient to provide the resulting carboxylic interpolymer with from 1 to 25 mol percent of the carboxyl moiety.

5. A liquid coating composition of claim 4 whereof said 100 parts of organic film-forming material further includes up to 65 parts of (c) at least one soluble compatible heat-reactive aminoplast condensate selected from the group consisting of melamine-formaldehyde-lower monohydric alkanol condensates, urea-formaldehyde-lower monohydric alkanol condensates, and benzoguanamine-formaldehyde-lower monohydric alkanol condensates.

6. A method of preparing a catalyzed liquid coating composition, characterized by improved package stability and increased pot life, consisting essentially of (I) blending (a) a carboxylic interpolymer made up of units from a plurality of copolymerizable alpha monoethylenically-unsaturated monomers including carboxylic units from an alpha, beta monoethylenically-unsaturated carboxylic monomer having from one to two carboxyl moieties per molecule in a proportion sufficient to provide the resulting carboxylic interpolymer with 1 to 25 mol percent of the carboxyl moiety, and (b) a film-forming epoxy compound compatible therewith having at least one oxirane moiety whereof the oxirane oxygen atom is linked to adjacent carbon atoms, any functional moieties in addition to said 1,2-oxirane moieties in said epoxy compound reactive with carboxyl moieties of said carboxylic interpolymer being limited to hydroxyl moieties, in the presence of a volatile liquid inert organic solvent for (a) and (b) in an amount sufficient to provide a liquid solution coating composition, (II) including in said liquid solution composition an aliphatic polyamine polyacetic acid stabilizer characterized as having a plurality of tertiary amine nitrogen atoms including two terminal tertiary amine nitrogen atoms, each tertiary nitrogen atom being linked to an adjacent nitrogen atom through a linking divalent saturated hydrocarbon radical of two to six carbon atoms, said linking hydrocarbon radical having no more than two carbon atoms when said plurality of tertiary nitrogen atoms exceeds two, the valences of said tertiary amine nitrogen atoms in excess of those satisfied by said linking divalent hydrocarbon radical being satisfied with at least three —$CH_2$—COOH moieties and no more than two —$CH_2$—$CH_2$—OH moieties, and (III) adding a quaternary ammonium salt as a catalyst to accelerate the cure of said carboxylic interpolymer (a) and said epoxy compound (b).

7. A liquid coating composition of claim 2 wherein said diamine polyacetic acid stabilizer is ethylenediamine tetraacetic acid.

8. A liquid coating composition of claim 2 wherein said diamine polyacetic acid stabilizer is hydroxyethylethylenediamine triacetic acid.

9. A liquid coating composition of claim 2 wherein said diamine polyacetic acid stabilizer is diaminocyclohexane tetraacetic acid.

10. A liquid coating composition of claim 3 wherein said polyamine polyacetic acid stabilizer is diethylenetriamine pentacetic acid.

11. A liquid coating composition of claim 1 wherein said interpolymer is made up of units from a vinyl aromatic hydrocarbon, units from an acrylic acid ester of an alkanol and monocarboxylic units from said alpha, beta monoethylenically unsaturated carboxylic acid and said epoxy compound is an epoxyhydroxy polyether condensate of a bis-phenol and epichlorohydrin.

12. A liquid coating composition of claim 11 which further includes at least one soluble compatible heat-reactive aminoplast condensate.

13. A liquid coating composition of claim 11 which further includes a paint pigment.

14. A liquid coating composition of claim 4 wherein said interpolymer is made up of said (A) units from styrene, said (B) units from an acrylic acid ester of a lower alkanol and said (C) carboxylic units from a half ester of a butenedioic acid and a monohydric alcohol, free from polymerizable non-benzenoid carbon-to-carbon unsaturation, and composed of carbon, hydrogen and oxygen, and ethylenediamine tetraacetic acid as said stabilizer.

15. A liquid coating composition of claim 4 wherein said interpolymer is made up of said (A) units from styrene, said (B) units from an acrylic acid ester of a lower alkanol and said (C) carboxylic units from an alpha, beta monoethylenically-unsaturated monocarboxylic acid having an alpha methylene group, and ethylenediamine tetraacetic acid as said stabilizer.

16. The method of claim 6 wherein said polyamine polyacetic acid stabilizer is ethylenediamine tetraacetic acid included in an effective stabilizing proportion ranging from 0.0025% up to about 0.1% based on the total weight of the liquid coating composition.

References Cited in the file of this patent

UNITED STATES PATENTS

| | | |
|---|---|---|
| 2,558,728 | Britton et al. | July 3, 1951 |
| 2,934,516 | Hicks | Apr. 26, 1960 |
| 3,014,881 | La Barre | Dec. 26, 1961 |
| 3,065,195 | Vasta | Nov. 20, 1962 |
| 3,070,564 | Roeser | Dec. 25, 1962 |